Nov. 18, 1958 — G. A. LYON, JR — 2,860,923
WHEEL COVER
Filed March 25, 1955 — 2 Sheets-Sheet 1
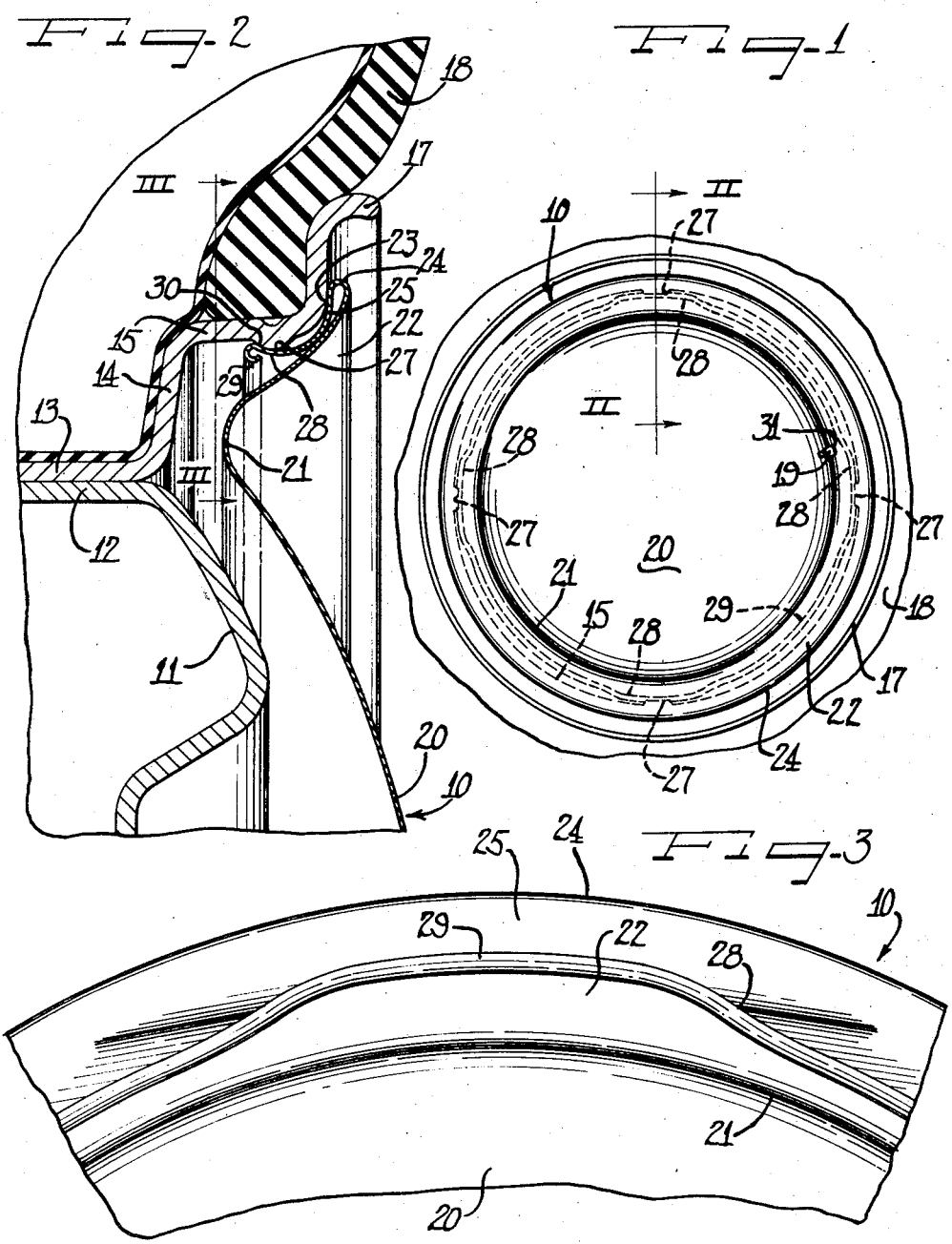
Inventor
George A. Lyon Jr

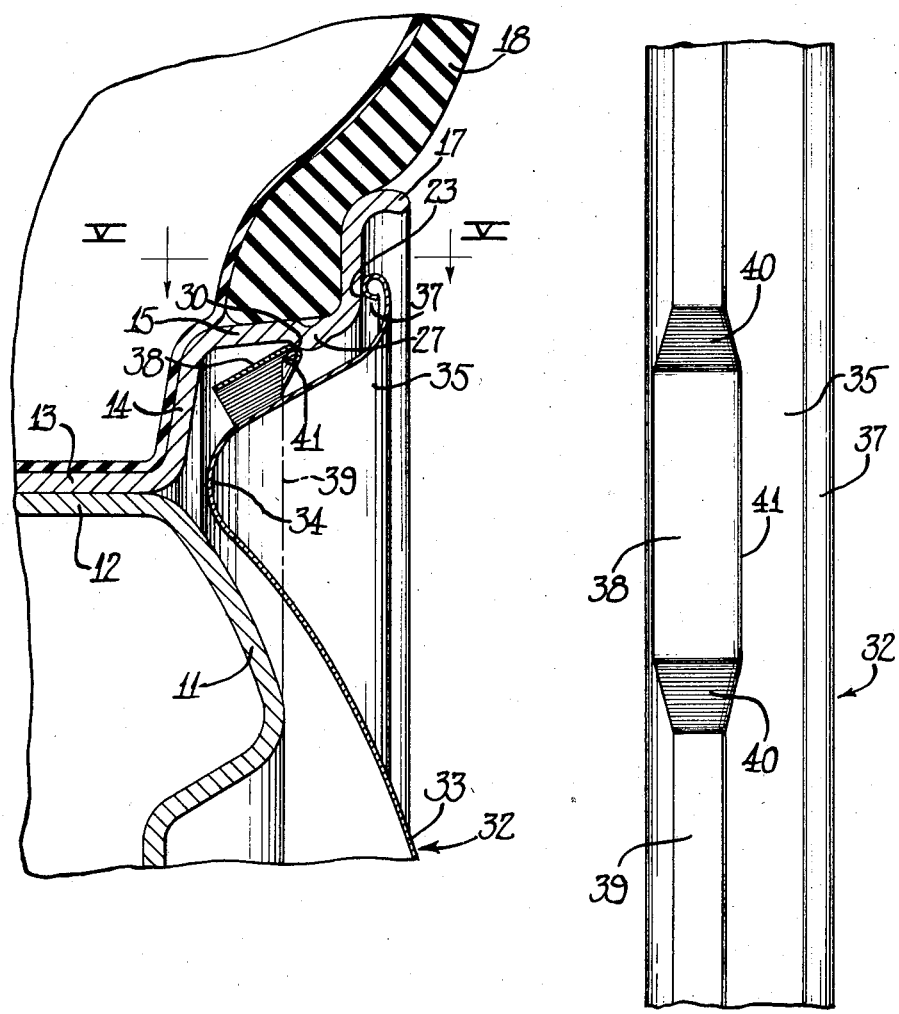

United States Patent Office 2,860,923
Patented Nov. 18, 1958

2,860,923

WHEEL COVER

George A. Lyon, Jr., Birmingham, Mich., assignor to Lyon Incorporated, Detroit, Mich., a corporation of Delaware Application March 25, 1955, Serial No. 496,726

11 Claims. (Cl. 301—37)

The present invention relates to improvements in wheel structures and more particularly concerns the ornamental and protective covering of the outer sides of the vehicle wheels.

An important object of the present invention is to provide in a wheel structure an improved means for retaining the cover on the outer side of a wheel.

Another object of the invention is to provide an improved wheel cover for disposition at the outer side of vehicle wheels such as automobile wheels, provided with improved means for retaining the cover on the wheel.

A further object of the invention is to provide improved retaining means for a vehicle wheel cover, such means being especially suitable for engaging retaining shoulder means on a radially facing portion of a wheel.

Still another object of the invention is to provide improved means for effecting an efficiently tensioned interengagement of resilient retaining shoulder means on a cover with opposing fixed retaining shoulder means on a wheel.

Other objects, features and advantages of the present invention will be readily apparent from the following detailed description of certain preferred embodiments thereof, taken in conjunction with the accompanying drawings, in which:

Figure 1 is an outer side elevational view of a vehicle wheel embodying features of the invention;

Figure 2 is an enlarged fragmentary radial sectional view taken substantially on the line II—II of Figure 1;

Figure 3 is a fragmentary rear elevational view of the cover of Figure 2 taken substantially in the plane of line III—III of Figure 2;

Figure 4 is a fragmentary radial sectional view similar to Figure 2 but showing a modified form of the invention; and Figure 5 is a fragmentary edge elevational detail view of the cover Figure 4 taken substantially in the plane of line V—V of Figure 4.

Having reference to Figures 1, 2 and 3, a wheel cover 10 according to the present invention is applied to the outer side of a vehicle wheel including a disk spider wheel body 11 having a marginal axially extending attachment flange 12 secured in a suitable manner to a tire rim base flange 13. From the tire rim base flange 13 extends generally radially outwardly an outer side flange 14 which merges with a generally axially outwardly extending and radially inwardly facing intermediate flange 15 from which extends a generally radially outwardly and then axially outwardly turned terminal flange 17. The relationship of the tire rim flange is such as to support a pneumatic tire and tube assembly 18 or a tubeless tire, as may be preferred. For inflating the tire a valve stem 19 projects in the usual manner from the side flange 14 of the tire rim.

While in the present instance the wheel cover 10 is shown as comprising a full disk cover, that is of a diameter to substantially completely cover the outer side of the wheel including the wheel body 11 and the tire rim, it will be appreciated that if preferred the cover could comprise an annulus cooperative with a separable hub cap. In any event, the cover 10 is made from suitable sheet material such as steel, including stainless steel, brass or other alloys such as aluminum. The material should be selected for economy and for the desired finish such as polishing and plating to afford a high luster for the outer side of the cover, or other desirable finish.

The cover 10 includes a circular stamped or otherwise formed body including a central crown portion 20 leading into an annular inwardly dished intermediate portion 21 which fits generally telescopically in spaced relation into the large annular groove between the bulging portion of the wheel body 11 and the tire rim. At the radially outer side of the indented dished portion 21 is a generally radially and axially outwardly directed outer marginal portion 22 of the cover adapted to overlie the intermediate flange 15 and the adjacent portion of the terminal flange 17 and more particularly a shoulder 23 adjacent juncture of the intermediate and terminal flanges. At its outer extremity the cover portion 22 is provided with a turned reenforcing and finishing edge structure 24 of generally rib or bead-like form.

For enhancing the marginal strength of the cover and also for providing retaining means for retaining engagement with the wheel, the cover has behind the outer marginal portion 22 thereof an annular preferably continuous flange 25 which may be a separate flange interengaged by lock-seaming or other attachment with the edge extremity structure of the cover portion 22, but in the present instance it is provided as a homogeneously integral underturned marginal extension flange of the cover portion 22.

By preference the flange 25 lies throughout the major extent thereof against or at least as close as practicable to the inner surface of the marginal cover portion 22. That is, the flange 25 is in backed up relation to the inner surface of the cover portion 22. Hence, the flange 25 in assembly with the wheel extends inwardly in spaced relation about and past the juncture of the intermediate and terminal flanges of the tire rim and opposite to the axially outer portion of the terminal flange 15. At its outer extremity portion, the flange 25 may shoulder or bottom against the rim shoulder 23 in the assembled relationship of the cover to the wheel.

For retaining interengagement with the wheel, and more particularly with retaining bumps 27 pressed radially inwardly in the axially outer portion of the intermediate flange 15, the flange 25 of the cover is provided at circumferentially spaced areas thereof corresponding in number to the retaining bump shoulder means of the wheel with generally radially outwardly projecting cover engaging projecting means 28, herein comprising radially outwardly offset portions from the continuous flange. The resiliency and cover retaining efficiency of the offset retaining portions 28 is improved by having the edge of the flange 25 turned to provide a reenforcing and resiliency improving bead-like structure 29 at least in the offset areas, but preferably continuously along the entire edge of the flange. The turned bead-like edge may be turned inwardly as shown, or it may be turned outwardly. However, certain advantages are attained from the inturned form shown since thereby backing up of the turned terminal against the cover portion 22 can be more certainly effected.

In order to provide for adequate resilience of the offset cover engaging portions 28, they are preferably of substantial width, and as best seen in Fig. 1, of substantially greater width by several times as the width of the retaining bumps 27. The radially outward projection or diameter described by the radially outwardly projecting terminals of the retaining portions 28 is slightly greater than the diameter described about the tips of the retaining bumps 27. Therefore, to apply the cover to the outer side of the wheel, the offset retaining portions can be snapped behind the bumps by axially inward pressure to cause the beaded terminals of the engagement portions to flex radially inwardly over the peaks of the bumps and then snap behind the bumps into engagement with generally axially and radially inwardly facing shoulders 30 on the bumps.

The length of the offset retaining portions 28 is such that in the full engagement of the retaining portions 28 with the wheel shoulders 30, the outer portion of the flange 25 is drawn snugly against the rim shoulder 23.

In applying the cover to the outer side of the wheel, a valve stem aperture 31 in the dished annular portion 21 is aligned with the valve stem 19 and thereby registration of the radially outward offset cover retaining portions 23 of the underturned flange with the retaining bumps 27 is effected. Then, axially inward pressure applied to the cover and more particularly the marginal portion 22 thereof will cause the retaining portions 28 to snap into engagement with the retaining bumps 27 and more particularly with the shoulders 30 thereon. Removal of the cover is effected by applying a pry-off tool such as a screw-driver behind the turned outer edge 24 thereof and applying pry-off leverage against the terminal flange 17 to force the retaining portions 28 of the underturned flange to snap out of retaining engagement with the retaining bumps.

In the modification of Figures 4 and 5, the wheel is substantially the same as in Figure 2 and therefore similar parts are similarly identified. In this form of the invention a cover 32 is provided for disposition at the outer side of the wheel and includes a plate having a central or crown portion 33 with an intermediate annular dished portion 34 thereabout, with a generally radially and axially outwardly directed sloping annular outer marginal portion 35 for overlying the tire rim and more particularly the intermediate flange 15 and the juncture shoulder 23 thereof. At its outer extremity the cover portion 35 is preferably provided with a reinforcing and finishing underturned bead 37.

For retaining the cover 32 in place on the wheel, radially outwardly offset cover retaining flange structure 38 is provided behind the outer marginal cover portion 35 for retaining engagement with the radially and axially inwardly facing shoulder means 30 provided herein by the retaining bumps 27. By preference, and as a matter of expediency in assembling the retaining flange structure 38 with the cover plate, it is constructed as a continuous band or at least substantially continuous strip 39 which may be secured to the back of the cover portion 35 as by welding or brazing or the like.

The location of the strip 39 with the cover retaining portions thereof offset therefrom, is preferably at the axially innermost portion of the cover marginal portion 35 so as to be accommodated in the maximum space in the gap between the cover portion 35 and the tire rim.

Each of the offset, projecting cover retaining portions 38 is offset from the band or strip 39 by means of respective opposite side angular offsetting or connecting flange portions 40. For transverse rigidity the portions 38 are preferably of substantial width so as to avoid tendency toward transverse buckling in their plane but enabling resilient deflection in a radial direction, normal to such plane.

To increase the resiliency of the cover retaining portions 38, and to facilitate sliding interengagement thereof with the cover retaining shoulders on the tire rim as afforded by the bumps 27, the axially outer edges of the cover retaining portions 38 are provided with turned terminals 41, herein comprising respective inturned bead structure. Thereby the wheel shoulder engaging edges of the portions 38 are reenforced and at the same time stiffened as to resiliency. The beneficial action of the bead 41 is enhanced by having the same merge into the offsetting flange portions 40 as best seen in Fig. 4.

In applying the cover 32 to the outer side of the wheel, registration of a suitable valve stem aperture (not shown) in the cover portion 34 with the valve stem is effected and thus alignment of the retaining portions 38 with the bumps 27 accomplished. Axially inward pressure on the cover causes the generally radially outwardly and axially inwardly facing outer surfaces of the retaining portions 38 to cam inwardly over the bumps 27 as enabled by the resilient radially inward deflection of the engaged portions of the retaining members. After the turned terminals 41 have passed the tips of the retaining bumps 27, the terminals snap into retaining engagement with the shoulders 30 and at the same time draw the underturned outer marginal bead 37 tightly against the rim shoulder 23. Removal of the cover is, of course, effected by applying a pry-off tool behind the turned outer edge portion 37 of the cover and applying pry-off leverage to cause the retaining members 38 to yield resiliently and snap outwardly past the retaining shoulders 30.

By reason of the direct back-up of the side portions of the resiliently tensionable retaining members 38 against the back of the cover, through the medium of the more or less resilient side flanges 40, strong resilient resistance to radial deflection of the retaining members 38 is afforded. The circumferential extent of the strip or flange 39 of which the offset retaining members 38 are a part effectively cooperates with the retaining members in affording such resistance to radial deflection, similarly as the underturned flange 25 by not only taking advantage of the inherent resilient and resistance to deformation of the flange itself, but also of the body portion against which the flange engages.

It will be understood that modifications and variations may be effected without departing from the scope of the novel concepts of the present invention.

I claim as my invention:

1. In a wheel structure including a wheel portion having a generally axially inwardly and radially facing shoulder structure, a cover for disposition at the outer side of the wheel having therebehind a continuous circumferential flange provided with spaced flange portions arranged to back up against the cover and alternating with circumferential generally radially offset radially resiliently deflectable cover retaining portions between the backup portions and retainingly engageable with the shoulder structure of the wheel.

2. In a wheel structure including a wheel portion having a generally axially inwardly and radially facing shoulder structure, a cover for disposition at the outer side of the wheel having therebehind a continuous circumferential flange provided with spaced flange portions arranged to back up against the cover and alternating with circumferential generally radially offset radially resiliently deflectable cover retaining portions between the backup portions and retainingly engageable with the shoulder structure of the wheel, said flange comprising a homogeneously integral portion of the cover turned under therebehind.

3. In a wheel structure including a wheel portion having a generally axially inwardly and radially facing shoulder structure, a cover for disposition at the outer side of the wheel having therebehind a circumferential flange provided with spaced flange portions arranged to back up against the cover and alternating with circumferential generally radially offset radially resiliently deflectable cover retaining portions between the backup portions and retainingly engageable with the shoulder structure of the wheel, said flange comprising a separate elongated element secured behind the cover and having the offset retaining portions connected thereto by angular offsetting flange portions.

4. In a wheel structure including a wheel portion having a generally axially inwardly and radially facing shoulder structure, a cover for disposition at the outer side of the wheel having therebehind a continuous circumferential flange provided with spaced flange portions arranged to back up against the cover and alternating with circumferential generally radially offset radially resiliently deflectable cover retaining portions between backup portions and retainingly engageable with the shoulder structure of the wheel, the portion of the cover against which the flange is arranged to back up resiliently resisting radial deflections of the flange and thus assisting in resiliently tensioning the retaining portions.

5. In a cover for disposition at the outer side of a vehicle wheel, a circular cover member having a portion thereof provided with a circumferentially continuous and inwardly extending flange arranged with spaced circumferential portions to back up against the cover member and provided with generally radially offset cover retaining radially resiliently yieldable portions alternating with and disposed between said backing portions and engageable with a wheel part to retain the cover on a wheel and resiliently resisted in radial deformation by the backing up of the flange against the cover.

6. In a cover for disposition at the outer side of a vehicle wheel, a circular cover member having a portion thereof provided with a circumferentially continuous and inwardly extending flange arranged with spaced circumferential portions to back up against the cover member and provided with generally radially offset cover retaining radially resiliently yieldable portions alternating with and disposed between said backup portions and engageable with a wheel part to retain the cover on a wheel and resiliently resisted in radial deformation by the backing up of the flange against the cover, said flange comprising an underturned marginal portion of the cover and provided with a terminal structure affording said offset portions.

7. In a cover for disposition at the outer side of a vehicle wheel, a circular cover member having a portion thereof provided with a circumferentially continuous and inwardly extending flange arranged with spaced circumferential portions to back up against the cover member and provided with generally radially offset cover retaining radially resiliently yieldable portions alternating with and disposed between said backup portions and engageable with a wheel part to retain the cover on a wheel and resiliently resisted in radial deformation by the backing up of the flange against the cover, said flange having a continuous turned extremity which in said offset portions provides stiffly resilient means for engagement with shoulder means on a wheel.

8. In a cover for disposition at the outer side of a vehicle wheel, a circular cover member having a portion thereof provided with a circumferentially disposed and inwardly extending flange arranged to back up thereagainst and provided with generally radially offset cover retaining radially resiliently yieldable portions engageable with a wheel part to retain the cover on a wheel and resiliently resisted in radial deformation by the backing up of the flange against the cover, said flange comprising an elongated strip spaced from a marginal extremity of the cover and with the offset portions connected to the strip by offsetting flange portions.

9. In a cover for disposition at the outer side of a vehicle wheel, a circular cover member having a portion thereof provided with a circumferentially disposed and inwardly extending flange arranged to back up thereagainst and provided with generally radially offset cover retaining radially resiliently yieldable portions engageable with a wheel part to retain the cover on a wheel and resiliently resisted in radial deformation by the backing up of the flange against the cover, said flange comprising an elongated strip spaced from a marginal extremity of the cover and with the offset portions connected to the strip by offsetting flange portions, said offset portions and the offsetting flanges having a turned resiliency enhancing terminal edge structure affording retaining engagement edge for direct engagement with shoulder means of the wheel.

10. In a wheel structure including a wheel portion having a generally axially inwardly and radially facing shoulder structure, a cover for disposition at the outer side of the wheel having therebehind a continuous circumferential flange provided with spaced flange portions arranged to back up against the cover and alternating with circumferential generally radially offset radially resiliently deflectable cover retaining portions between the backup portions and retainingly engageable with the shoulder structure of the wheel, said flange having throughout its entire circumferential extent a turned reinforcing terminal which, on said flange portions arranged to back up against the cover, engage against the cover in the backed up relation of said spaced flange portions.

11. In a wheel structure including a tire rim having a generally radially facing annular flange provided with a circumferentially spaced series of generally radially inwardly projecting cover retaining bumps provided with generally axially inwardly facing shoulders, a cover for disposition over the outer side of the wheel including a marginal portion for overlying the tire rim and provided therebehind with a circumferentially continuous generally axially extending flange which throughout the major portion of its diameter is smaller than the diameter described about the tips of the retaining bumps, said cover flange having at circumferentially spaced inervals matching the retaining bumps radially outwardly offset portions of substantially greater width than the width of said bumps and provided with cover retaining shoulders that face generally axially outwardly and are engageable in press-on, pry-off relation with the bump shoulders for retaining the cover on the wheel, said radially offset portions of the cover flange being joined at the circumferentially opposite sides of said offset portions by generally radially extending angular offsetting and connecting flange portions and thereby rigidifying the circumferentially opposite sides of said offset portions, said offset portions being resiliently deflectable in radial direction intermediate said side offsetting portions to enable press-on and pry-off passage past the radially inwardly projecting portions of the retaining bumps axially outwardly relative to the retaining bump shoulders.

References Cited in the file of this patent

UNITED STATES PATENTS

| | | |
|---|---|---|
| 2,347,206 | Lyon | Apr. 15, 1944 |
| 2,535,081 | Lyon | Dec. 26, 1950 |
| 2,607,633 | Lyon | Aug. 19, 1952 |
| 2,624,635 | Lyon | Jan. 6, 1953 |